Nov. 11, 1958     M. W. JONES     2,860,029
MOVABLE BLOTTER AND MEANS FOR SUPPORTING THE BLOTTER
IN ENGAGEMENT WITH A MOVABLE METER CHART
Filed Oct. 7, 1955
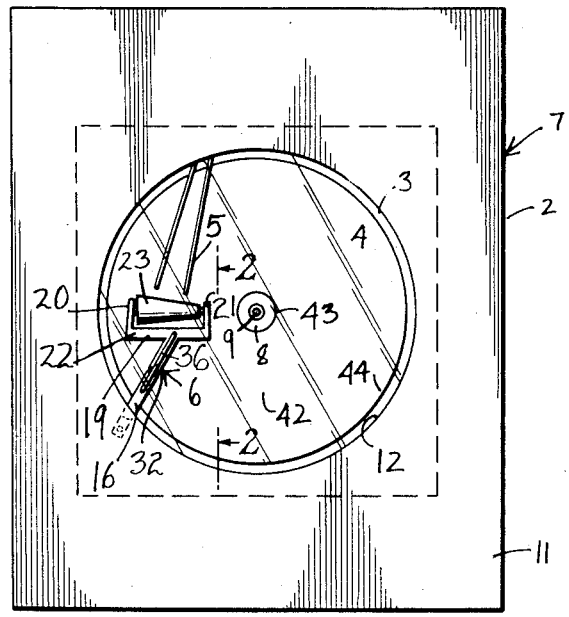
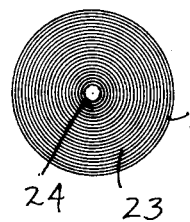
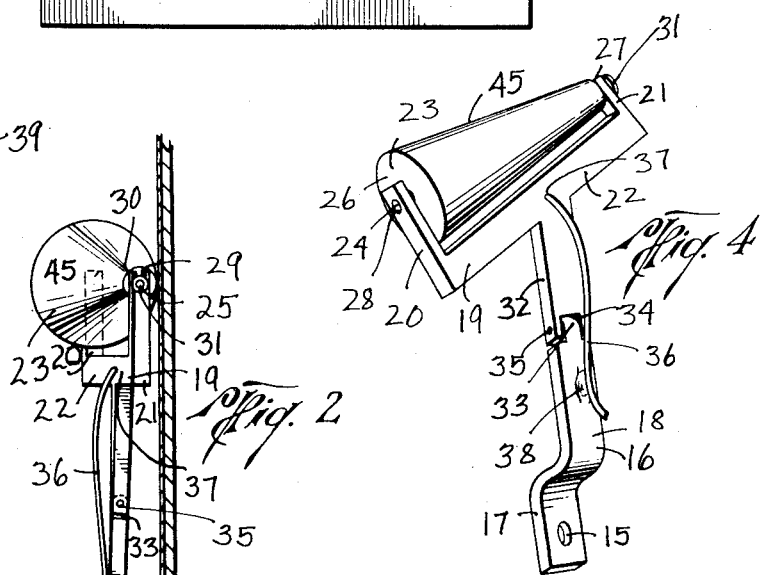
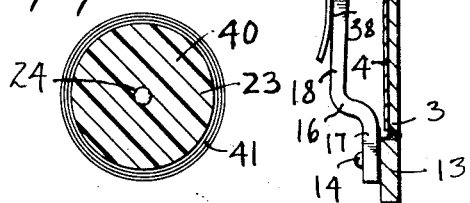
MAURICE W. JONES
*INVENTOR.*
BY *Jack W. Hayden*
ATTORNEY

United States Patent Office 2,860,029
Patented Nov. 11, 1958

2,860,029

MOVABLE BLOTTER AND MEANS FOR SUPPORTING THE BLOTTER IN ENGAGEMENT WITH A MOVABLE METER CHART

Maurice W. Jones, Baytown, Tex.

Application October 7, 1955, Serial No. 539,194

2 Claims. (Cl. 346—146)

The present invention relates to a meter chart blotter and more particularly to an arrangement whereby a movable blotting surface may be yieldably urged into contact with a moving meter chart for drying ink markings on the chart to inhibit ink smears on the chart and to aid in producing a more accurate marking on the chart which can be more accurately read or interpreted.

Various arrangements of rotatable or moving meter charts are provided in industry wherein a stylus or pen marks on a chart a record of temperature, pressure, rate of flow or other variables in relation to each other or in relation to time.

There are numerous meter constructions in use at the present time for accomplishing this function, which constructions are well known and the present invention is directed to an arrangement whereby markings on the charts of the meters may be contacted by a blotting surface immediately after such markings have been made on the meter chart to inhibit smearing of such markings and to inhibit deterioration of the markings due to weather causes such as rain, fading from sunshine and the like.

It is extremely desirable that such meter charts preserve as accurately as possible, a record of the measurement being made and it is not uncommon for the pen or stylus mechanism which makes the mark on the meter chart to feed ink improperly so as to tend to blur the mark made, which makes reading the meter chart more difficult. Also, the meter chart housings may, under some circumstances, be mounted in the open where they are subject to the weather which may cause rapid deterioration of the chart and make the interpretation or reading of the markings thereon more difficult.

The present invention provides a movable surface which is adapted to yieldably engage a chart surface of a meter at all times so as to present a blotting surface to dry the ink markings as rapidly as possible after they are made on the chart to preserve a more accurate record of the markings on the chart.

Another object of the invention is to provide a means whereby a dry blotting surface may be continuously urged against a moving meter chart without interfering with the movement of the chart or the record being made thereon, but which acts to dry the ink markings on the meter chart as quickly as possible after they are made.

Still another object of the invention is to provide a cone shaped member having a surface thereon for engaging a meter chart to dry the ink markings made on the meter chart, a bracket for supporting the cone member rotatably against the chart and spring means cooperating with the bracket for urging the bracket and the cone member towards the meter chart so as to maintain contact between the chart and the blotting surface of the cone member at all times.

Still another object of the invention is to provide a bracket for holding a blotting surface adjacent a meter chart, which bracket is constructed and arranged and is provided with spring means for continuously urging the blotting surface supported by the bracket towards the meter chart to be engaged by the blotting surface.

Yet a further object of the invention is to provide a blotter for a movable meter chart which blotter is supported to contact the meter chart and movable with meter chart as it is moved so as to present a continuous dry surface to the meter chart as ink markings are made thereon.

A further object of the invention is to provide a novel form of blotter construction for a movable meter chart whereby the used portion of the blotter may be easily and quickly removed without interfering with the operation of such blotter.

Yet a further object of the invention is to provide a rotatable blotter which is adapted to be resiliently supported in contact with a meter chart for drying markings on the chart, the used portions of said blotter being removable without stopping the rotatable blotter or without interfering or lifting it from the meter chart which it is drying.

Other objects and advantages of the invention will become more readily apparent from a consideration of the following description and drawings, wherein:

Fig. 1 is a front elevation of a meter chart housing illustrating a meter chart mounted in the housing and the present invention mounted within the housing for engaging the movable meter chart to dry the ink markings as they are made thereon;

Fig. 2 is a sectional view on the line 2—2 of Fig. 1 showing the present invention in side view and positioned in the meter housing and contacting the meter chart which it is drying;

Fig. 3 is an end view illustrating a form of the blotter;

Fig. 4 is a perspective view of the invention showing the blotter mounted in the bracket for movement as the chart moves and the spring means for urging the blotter into engagement with the meter chart; and Fig. 5 is an end view of the blotter similar to Fig. 3, but illustrating an alternate embodiment of the blotter construction.

In Fig. 1 a meter chart housing is denoted at 2 and mounted therein is a motor means (not shown) for moving the shaft 9 and chart 4 mounted on the front end thereof. Styli 5 are mounted so as to make a record on the chart 4 of any desired measurement such as temperature, rate of flow, pressure, etc., relative to each other or any other measurement, or relative to time. The present invention is denoted generally at 6 and is shown mounted so as to contact the face of chart 4 to dry the ink markings made by styli 5 to inhibit smearing of such marks or deterioration thereof from weather conditions. Thus, a more accurate record of the measurement being recorded is obtained and such record is easier to interpret or read after it has been completed.

The construction of the meters denoted generally by the numeral 7 is well known in the art and while the present invention is described and illustrated as being applied to a particular form or embodiment of meter, it seems apparent that such invention will function as readily and efficiently with any other form of meter desired without departing from the scope of the invention. In the form of meter illustrated in Fig. 1 of the drawings, a suitable motor means (not shown) may be mounted within the housing 2 and a power connection from such motor serves to rotate the shaft 9 at a desired speed. The chart 4 may be removably positioned on the shaft 9 by suitable means such as by mounting it on a disc (not shown) which is secured adjacent the end of shaft 9 and rotates therewith. The nut 8 is adapted to engage shaft 9 which protrudes through an opening in the front of plate 3 and at the center thereof and serves to position the chart 4 between the disc and nut 8. This stationary plate 3 is in back of and in close relationship to the disc and serves as a support for the chart 4 as it is rotated by shaft 9. In the form of meter and meter chart illustrated, the meter chart 4 is disc-shaped and is provided with an opening at the center thereof to fit about shaft 9. The styli 5 are linked to mechanism which moves the styli across the face of the chart 4 in response to variations in the measurements such styli are recording on the chart whereby a record may be made of such measurement.

A cover 11 may be secured to the housing 2 by suitable means such as by hinges and a window 12 may be provided in such cover for viewing the chart exteriorly of the housing with the cover 11 closed. Access to the interior of the housing 2 for changing the chart 4 or for any other operation may be gained by opening the cover 11 on its hinges. The construction and arrangement of the meter 7 and the operating mechanism for the chart and the styli or pens 5 is well known in the art and it is believed unnecessary to give a detailed description thereof.

The present invention illustrated generally at 6 is adapted to be secured within the housing 2 on the frame 13 by any suitable means such as a screw 14 or the like, which fits through opening 15 in the end of the outer or second bracket arm member 16. It is to be noted that the end portion 17 of the arm 16 is displaced out of the longitudinal plane or axis of the arm 16 so that the portion 18 of such arm is upstanding or above the portion 17.

A bracket 19 of a generally U shape including spaced side arms 20 and 21 connected together by body 22 is adapted to receive and support the cone member 23, shaped as the frustum of a cone, therein in position to engage the surface of the meter chart 4 as illustrated in Figs. 1 and 2 of the drawings. Member 23 is provided with spindles or projections 24 and 25 extending from each end 26 and 27 respectively. The axial projections 24 and 25 are adapted to be received in the openings 28 and 29 respectively of each of the arms 20 and 21 for holding the member 23 in bracket 19. The opening 29 may be in the form of a slot extending from the outer end 30 of arm 21 whereby the member 23 may be removed from the bracket 19 by sliding the projection 25 outwardly and then removing projection 24 from opening 28 of arm 20, if desired. The slot 29 may be suitably contoured to form a wedging fit with the shaft or spindle 25 so as to retain the conical member 23 in position in the bracket when the projections 24 and 25 are in openings 28 and 29. If desired, a head 31 on the end of projection or shaft 25 may be provided for aiding in grasping such shaft to position the member 23 within the bracket 19 and to remove it from the bracket.

Projecting from the rear of the bracket 19 is a member 32 which member is inclined in the plane of bracket 19 and towards the end of bracket 19 which is adapted to hold the larger end of the cone member 23. The member 32 is pivotally connected with the outer member 16 by means of the projection 33 on the end of member 16 which fits within cut-away 34 on member 32. Pivot pin 35 fits through the end of the member 32 and through projection 33 to pivotally engage the members 32 and 16 together.

The member 32 is, as previously mentioned, secured to the bracket 19 and when the screw 14 is secured through the end portion 17 of member 16, the cone member 23 will be positioned over the face of the meter chart as shown in Figs. 1 and 2 of the drawings, completely along the line of contact between the chart 4 and the member 23. Suitable spring means 36 are provided to urge the member 23 against the face of the chart 4 completely along the outer surface of member 23. Such spring also maintains the member 23 against the chart 4 while both are rotating. As illustrated in the drawings, the spring may be secured to the body 22 of bracket 19 as shown at 37 and extends longitudinally of the arms 32 and 16 to rest on the arm 16 in recessed portion 38 thereof. The spring means 36 is constructed and arranged as illustrated in the drawings to exert a force to press the bracket 19 towards the chart and acts to continually urge the member 23 against the face of the chart 4.

The member 23 may be formed of absorbent paper material or the like, built up of a plurality of layers of such material as illustrated at 39 in Fig. 3 so that as such blotting paper is used, it may be torn from the roller merely by opening the cover 11 and without lifting the member 23 off the face of the chart, tearing the used part of the material off member 23. If desired, a body 40 of suitable material such as plastic or the like may be provided to form the member 23 with a plurality of layers of absorbent paper 41 built up on the outer periphery thereof.

The invention is positioned immediately below the stylus 5 and is adapted to dry or blot the ink record as quickly as possible after it has been made on the chart 4. The length of the member 23 may be increased or decreased, depending upon the size chart it is adapted to engage and as illustrated in the drawings, the invention is shown as engaging only the center portion 42 of the chart for purposes of illustration; however, if desired, the member 23 could be constructed so as to contact the chart from the center 43 thereof to the outer edge 44.

To further aid in describing the invention, it will be assumed that the chart 4 is mounted on the shaft 9 and the invention has been secured in position on the disc on the end thereof as illustrated in Fig. 1 of the drawings. The spring means 36 may be adjusted by bending thereof so as to exert the desired amount of pressure at the depressed portion 38 of member 16 so as to urge the member 23 against the face of the chart 4 with the desired amount of pressure. It is desired that the member 23 always contact the face of chart 4, so that it may rotate as the chart is rotated, but it is desirable that the pressure of member 23 not be great enough to affect or interfere with the movement of chart 4. As the chart 4 is rotated, the stylus 5 will mark an ink record thereon and the member 23 with the blotting surface 45 on the outer periphery thereof will engage the chart the complete length of member 23 as shown in Figs. 1 and 2 so as to dry the ink marking or record as it is made on the chart. The member 23 is freely rotatably supported by the bracket 19 and will rotate as the chart 4 is rotated so that a continuously fresh portion of the blotting surface 45 is presented to the chart 4. As the blotting surface 45 of the member 23 becomes used, it may be periodically ripped off the member 23 without the necessity of removing the member from the bracket 19 or without lifting such member off the face of the chart.

The construction of members 32 and 16 and their pivotal relationship permits member 23 to be moved away from the chart 4 for removal thereof and insertion of a new one as needed. The spring 36 is rotatably secured in bracket 19 at 37 and its end may be grasped and lifted out of depression or recessed portion 38 whereupon it may be swung towards the member 23 so as to act as a lever or handle in lifting such member off chart 4.

Broadly the invention relates to a meter chart blotter and to a bracket for supporting the blotter so as to continuously urge it into contact with a moving chart.

What is claimed is:

1. A rotatable blotter for a meter chart comprising a cone shaped member, a blotting surface over the entire outer periphery thereof, a projection extending from each end of said cone, a bracket including spaced arms for engaging each of said projections whereby said cone member may be rotatably supported in said bracket, an arm depending from said bracket at the rear thereof, said arm being inclined in the plane of said bracket and towards said arm which holds the larger end of said cone member, a second arm pivotally engaged in the end of said first mentioned arm, said second arm having its end portion bent out of the longitudinal plane of said second arm and there being an opening in said portion for receiving a screw whereby said second arm may be positioned to hold said bracket and cone shaped member therein adjacent the meter chart, and spring means connected between said bracket and said second arm for urging said arms and bracket and said cone shaped member towards the meter chart whereby the blotting surface on said cone member may engage the meter chart to blot it.

2. A blotter for engaging a movable meter chart including, a bracket, means for connecting said bracket so that it extends over the meter chart, said connecting means including an arm extending from said bracket, a second arm pivotally engaged with said first mentioned arm, and means for engaging said second arm to position said bracket over the meter chart, a cone shaped member rotatably mounted in said bracket and having a blotting surface thereon for engaging the meter chart to blot ink markings thereon, and spring means on said bracket and yieldably urging said bracket toward the meter chart whereby said blotting surface may continuously engage the meter chart as it is moved, said spring means spanning between said bracket and second arm for urging said arms and bracket toward the meter chart.

References Cited in the file of this patent

UNITED STATES PATENTS

| | | |
|---|---|---|
| 151,987 | Ketcham | June 16, 1874 |
| 1,387,298 | Odom | Aug. 9, 1921 |
| 2,456,009 | McLane | Dec. 14, 1948 |
| 2,702,227 | Segerstad | Feb. 15, 1955 |